US00RE37476B1

(19) United States
(12) Reissued Patent
Gerber

(10) Patent Number: US RE37,476 E
(45) Date of Reissued Patent: Dec. 18, 2001

(54) ALPHA BLENDING PALETTIZED IMAGE DATA

(75) Inventor: Richard Gerber, San Francisco, CA (US)

(73) Assignee: Intel Corporation, Santa Clara, CA (US)

(21) Appl. No.: 09/538,666

(22) Filed: Mar. 28, 2000

Related U.S. Patent Documents

Reissue of:
(64) Patent No.: 5,831,604
Issued: Nov. 3, 1998
Appl. No.: 08/657,402
Filed: Jun. 3, 1996

(51) Int. Cl.[7] ..... G06T 5/00

(52) U.S. Cl. ..... 345/431; 345/561; 345/601; 345/524

(58) Field of Search ..... 345/199, 186, 345/501, 523, 524, 431, 549, 561, 562, 600–605

(56) References Cited

U.S. PATENT DOCUMENTS 5,625,764 * 4/1997 Tsujimoto et al. ..... 345/431
5,914,725 * 6/1999 MacInnis et al. ..... 345/441

* cited by examiner

*Primary Examiner*—Kee M. Tung
(74) *Attorney, Agent, or Firm*—Howard A. Skaist

(57) ABSTRACT

Palettized image data for two or more images, represented by color lookup table (CLUT) indices, are mapped to an index space. Blended pixels are generated from the pixels in the index space using alpha blending. The blended pixels are mapped back to CLUT indices to generate palettized blended image data. In a preferred embodiment, in which the CLUT is generated based on a characterized structure in YUV space, the CLUT indices are mapped to Y and UV indices in a YUV index space. The Y and UV indices are then used to generate three-coordinate blended pixels. The three-coordinate blended pixels are then mapped back to CLUT indices of a palettized blended image. Table lookups are used to generate the blended pixels from the Y and UV indices and to map the blended pixels back to CLUT indices.

30 Claims, 12 Drawing Sheets

FIG. 1a

| UV INDEX | Y INDEX | CLUT INDEX | RED | GREEN | BLUE |
|---|---|---|---|---|---|
| 0 | 0 | 10 | 25 | 25 | 25 |
| | 1 | 11 | 43 | 43 | 43 |
| | 2 | 12 | 60 | 60 | 60 |
| | 3 | 13 | 77 | 77 | 77 |
| | 4 | 14 | 95 | 95 | 95 |
| | 5 | 15 | 112 | 112 | 112 |
| | 6 | 16 | 130 | 130 | 130 |
| | 7 | 17 | 147 | 147 | 147 |
| | 8 | 18 | 165 | 165 | 165 |
| | 9 | 19 | 182 | 182 | 182 |
| | 10 | 20 | 200 | 200 | 200 |
| | 11 | 21 | 217 | 217 | 217 |
| | 12 | 22 | 235 | 235 | 235 |
| 1 | 0 | 23 | 0 | 51 | 25 |
| | 1 | 24 | 0 | 69 | 43 |
| | 2 | 25 | 9 | 86 | 60 |
| | 3 | 26 | 26 | 104 | 77 |
| | 4 | 27 | 44 | 121 | 95 |
| | 5 | 28 | 61 | 138 | 112 |
| | 6 | 29 | 79 | 156 | 130 |
| | 7 | 30 | 96 | 173 | 147 |
| | 8 | 31 | 114 | 191 | 165 |
| | 9 | 32 | 131 | 208 | 182 |
| | 10 | 33 | 149 | 226 | 200 |
| | 11 | 34 | 166 | 243 | 217 |
| | 12 | 35 | 184 | 255 | 235 |

FIG. 1b

| UV INDEX | Y INDEX | CLUT INDEX | RED | GREEN | BLUE |
|---|---|---|---|---|---|
| 2 | 0 | 36 | 25 | 38 | 0 |
| | 1 | 37 | 43 | 55 | 0 |
| | 2 | 38 | 60 | 73 | 0 |
| | 3 | 39 | 78 | 90 | 13 |
| | 4 | 40 | 95 | 107 | 30 |
| | 5 | 41 | 112 | 125 | 48 |
| | 6 | 42 | 130 | 142 | 65 |
| | 7 | 43 | 147 | 160 | 83 |
| | 8 | 44 | 165 | 177 | 100 |
| | 9 | 45 | 182 | 195 | 118 |
| | 10 | 46 | 200 | 212 | 135 |
| | 11 | 47 | 217 | 230 | 153 |
| | 12 | 48 | 235 | 247 | 170 |
| 3 | 0 | 49 | 76 | 0 | 25 |
| | 1 | 50 | 94 | 17 | 43 |
| | 2 | 51 | 111 | 34 | 60 |
| | 3 | 52 | 129 | 51 | 78 |
| | 4 | 53 | 146 | 69 | 95 |
| | 5 | 54 | 163 | 86 | 112 |
| | 6 | 55 | 181 | 104 | 130 |
| | 7 | 56 | 198 | 121 | 147 |
| | 8 | 57 | 216 | 139 | 165 |
| | 9 | 58 | 233 | 156 | 182 |
| | 10 | 59 | 251 | 174 | 200 |
| | 11 | 60 | 255 | 191 | 217 |
| | 12 | 61 | 255 | 209 | 235 |

FIG. 1c

| UV INDEX | Y INDEX | CLUT INDEX | RED | GREEN | BLUE |
|---|---|---|---|---|---|
| 4 | 0 | 62 | 25 | 13 | 90 |
| | 1 | 63 | 43 | 30 | 107 |
| | 2 | 64 | 60 | 48 | 125 |
| | 3 | 65 | 77 | 65 | 142 |
| | 4 | 66 | 95 | 82 | 159 |
| | 5 | 67 | 112 | 100 | 177 |
| | 6 | 68 | 130 | 117 | 194 |
| | 7 | 69 | 147 | 135 | 212 |
| | 8 | 70 | 165 | 152 | 229 |
| | 9 | 71 | 182 | 170 | 247 |
| | 10 | 72 | 200 | 187 | 255 |
| | 11 | 73 | 217 | 205 | 255 |
| | 12 | 74 | 235 | 222 | 255 |
| 5 | 0 | 75 | 0 | 64 | 0 |
| | 1 | 76 | 0 | 81 | 0 |
| | 2 | 77 | 9 | 99 | 0 |
| | 3 | 78 | 26 | 116 | 13 |
| | 4 | 79 | 44 | 133 | 30 |
| | 5 | 80 | 61 | 151 | 48 |
| | 6 | 81 | 79 | 168 | 65 |
| | 7 | 82 | 96 | 186 | 83 |
| | 8 | 83 | 114 | 203 | 100 |
| | 9 | 84 | 131 | 221 | 118 |
| | 10 | 85 | 149 | 238 | 135 |
| | 11 | 86 | 166 | 255 | 153 |
| | 12 | 87 | 184 | 255 | 170 |

FIG. 1d

| UV INDEX | Y INDEX | CLUT INDEX | RED | GREEN | BLUE |
|---|---|---|---|---|---|
| 6 | 0 | 88 | 0 | 39 | 90 |
| | 1 | 89 | 0 | 56 | 107 |
| | 2 | 90 | 9 | 74 | 125 |
| | 3 | 91 | 26 | 91 | 142 |
| | 4 | 92 | 44 | 108 | 159 |
| | 5 | 93 | 61 | 126 | 177 |
| | 6 | 94 | 79 | 143 | 194 |
| | 7 | 95 | 96 | 161 | 212 |
| | 8 | 96 | 114 | 178 | 229 |
| | 9 | 97 | 131 | 196 | 247 |
| | 10 | 98 | 149 | 213 | 255 |
| | 11 | 99 | 166 | 231 | 255 |
| | 12 | 100 | 184 | 248 | 255 |
| 7 | 0 | 101 | 76 | 0 | 90 |
| | 1 | 102 | 94 | 4 | 107 |
| | 2 | 103 | 111 | 22 | 125 |
| | 3 | 104 | 129 | 39 | 142 |
| | 4 | 105 | 146 | 56 | 160 |
| | 5 | 106 | 163 | 74 | 177 |
| | 6 | 107 | 181 | 91 | 194 |
| | 7 | 108 | 198 | 109 | 212 |
| | 8 | 109 | 216 | 126 | 229 |
| | 9 | 110 | 233 | 144 | 247 |
| | 10 | 111 | 251 | 161 | 255 |
| | 11 | 112 | 255 | 179 | 255 |
| | 12 | 113 | 255 | 196 | 255 |

FIG. 1e

| UV INDEX | Y INDEX | CLUT INDEX | RED | GREEN | BLUE |
|---|---|---|---|---|---|
| 8 | 0 | 114 | 76 | 12 | 0 |
| | 1 | 115 | 94 | 29 | 0 |
| | 2 | 116 | 111 | 47 | 0 |
| | 3 | 117 | 129 | 64 | 13 |
| | 4 | 118 | 146 | 81 | 30 |
| | 5 | 119 | 164 | 99 | 48 |
| | 6 | 120 | 181 | 116 | 65 |
| | 7 | 121 | 198 | 134 | 83 |
| | 8 | 122 | 216 | 151 | 100 |
| | 9 | 123 | 233 | 169 | 118 |
| | 10 | 124 | 251 | 186 | 135 |
| | 11 | 125 | 255 | 204 | 153 |
| | 12 | 126 | 255 | 221 | 170 |
| 9 | 0 | 127 | 25 | 50 | 0 |
| | 1 | 128 | 43 | 68 | 0 |
| | 2 | 129 | 60 | 85 | 0 |
| | 3 | 130 | 78 | 103 | 0 |
| | 4 | 131 | 95 | 120 | 0 |
| | 5 | 132 | 112 | 137 | 0 |
| | 6 | 133 | 130 | 155 | 1 |
| | 7 | 134 | 147 | 172 | 18 |
| | 8 | 135 | 165 | 190 | 36 |
| | 9 | 136 | 182 | 207 | 53 |
| | 10 | 137 | 200 | 225 | 71 |
| | 11 | 138 | 217 | 242 | 88 |
| | 12 | 139 | 235 | 255 | 106 |

FIG. 1f

| UV INDEX | Y INDEX | CLUT INDEX | RED | GREEN | BLUE |
|---|---|---|---|---|---|
| 10 | 0 | 140 | 127 | 0 | 25 |
| | 1 | 141 | 145 | 0 | 43 |
| | 2 | 142 | 162 | 8 | 60 |
| | 3 | 143 | 180 | 25 | 78 |
| | 4 | 144 | 197 | 43 | 95 |
| | 5 | 145 | 215 | 60 | 112 |
| | 6 | 146 | 232 | 78 | 130 |
| | 7 | 147 | 249 | 95 | 147 |
| | 8 | 148 | 255 | 113 | 165 |
| | 9 | 149 | 255 | 130 | 182 |
| | 10 | 150 | 255 | 148 | 200 |
| | 11 | 151 | 255 | 165 | 217 |
| | 12 | 152 | 255 | 183 | 235 |
| 11 | 0 | 153 | 0 | 77 | 25 |
| | 1 | 154 | 0 | 95 | 43 |
| | 2 | 155 | 0 | 112 | 60 |
| | 3 | 156 | 0 | 130 | 77 |
| | 4 | 157 | 0 | 147 | 95 |
| | 5 | 158 | 10 | 164 | 112 |
| | 6 | 159 | 28 | 182 | 130 |
| | 7 | 160 | 45 | 199 | 147 |
| | 8 | 161 | 63 | 217 | 165 |
| | 9 | 162 | 80 | 234 | 182 |
| | 10 | 163 | 98 | 252 | 200 |
| | 11 | 164 | 115 | 255 | 217 |
| | 12 | 165 | 132 | 255 | 235 |

FIG. 1g

| UV INDEX | Y INDEX | CLUT INDEX | RED | GREEN | BLUE |
|---|---|---|---|---|---|
| 12 | 0 | 166 | 25 | 0 | 154 |
| | 1 | 167 | 43 | 18 | 172 |
| | 2 | 168 | 60 | 35 | 189 |
| | 3 | 169 | 77 | 52 | 207 |
| | 4 | 170 | 95 | 70 | 224 |
| | 5 | 171 | 112 | 87 | 241 |
| | 6 | 172 | 130 | 105 | 255 |
| | 7 | 173 | 147 | 122 | 255 |
| | 8 | 174 | 165 | 140 | 255 |
| | 9 | 175 | 182 | 157 | 255 |
| | 10 | 176 | 200 | 175 | 255 |
| | 11 | 177 | 217 | 192 | 255 |
| | 12 | 178 | 235 | 210 | 255 |
| 13 | 0 | 179 | 76 | 24 | 0 |
| | 1 | 180 | 94 | 42 | 0 |
| | 2 | 181 | 111 | 59 | 0 |
| | 3 | 182 | 129 | 76 | 0 |
| | 4 | 183 | 146 | 94 | 0 |
| | 5 | 184 | 164 | 111 | 0 |
| | 6 | 185 | 181 | 129 | 1 |
| | 7 | 186 | 198 | 146 | 18 |
| | 8 | 187 | 216 | 164 | 36 |
| | 9 | 188 | 233 | 181 | 53 |
| | 10 | 189 | 251 | 199 | 71 |
| | 11 | 190 | 255 | 216 | 88 |
| | 12 | 191 | 255 | 234 | 106 |

FIG. 1h

| UV INDEX | Y INDEX | CLUT INDEX | RED | GREEN | BLUE |
|---|---|---|---|---|---|
| 14 | 0 | 192 | 127 | 0 | 0 |
| | 1 | 193 | 145 | 3 | 0 |
| | 2 | 194 | 162 | 21 | 0 |
| | 3 | 195 | 180 | 38 | 13 |
| | 4 | 196 | 197 | 55 | 30 |
| | 5 | 197 | 215 | 73 | 48 |
| | 6 | 198 | 232 | 90 | 65 |
| | 7 | 199 | 250 | 108 | 83 |
| | 8 | 200 | 255 | 125 | 100 |
| | 9 | 201 | 255 | 143 | 118 |
| | 10 | 202 | 255 | 160 | 135 |
| | 11 | 203 | 255 | 178 | 153 |
| | 12 | 204 | 255 | 195 | 170 |
| 15 | 0 | 205 | 0 | 76 | 0 |
| | 1 | 206 | 0 | 94 | 0 |
| | 2 | 207 | 9 | 111 | 0 |
| | 3 | 208 | 26 | 129 | 0 |
| | 4 | 209 | 44 | 146 | 0 |
| | 5 | 210 | 61 | 163 | 0 |
| | 6 | 211 | 79 | 181 | 1 |
| | 7 | 212 | 96 | 198 | 18 |
| | 8 | 213 | 114 | 216 | 36 |
| | 9 | 214 | 131 | 233 | 53 |
| | 10 | 215 | 149 | 251 | 71 |
| | 11 | 216 | 166 | 255 | 88 |
| | 12 | 217 | 184 | 255 | 106 |

FIG. 1i

| UV INDEX | Y INDEX | CLUT INDEX | RED | GREEN | BLUE |
|---|---|---|---|---|---|
| 16 | 0 | 218 | 0 | 65 | 90 |
| | 1 | 219 | 0 | 82 | 107 |
| | 2 | 220 | 0 | 100 | 125 |
| | 3 | 221 | 0 | 117 | 142 |
| | 4 | 222 | 0 | 134 | 159 |
| | 5 | 223 | 10 | 152 | 177 |
| | 6 | 224 | 28 | 169 | 194 |
| | 7 | 225 | 45 | 187 | 212 |
| | 8 | 226 | 63 | 204 | 229 |
| | 9 | 227 | 80 | 222 | 247 |
| | 10 | 228 | 98 | 239 | 255 |
| | 11 | 229 | 115 | 255 | 255 |
| | 12 | 230 | 132 | 255 | 255 |
| 17 | 0 | 231 | 0 | 26 | 154 |
| | 1 | 232 | 0 | 44 | 172 |
| | 2 | 233 | 9 | 61 | 189 |
| | 3 | 234 | 26 | 78 | 207 |
| | 4 | 235 | 44 | 96 | 224 |
| | 5 | 236 | 61 | 113 | 241 |
| | 6 | 237 | 79 | 131 | 255 |
| | 7 | 238 | 96 | 148 | 255 |
| | 8 | 239 | 114 | 166 | 255 |
| | 9 | 240 | 131 | 183 | 255 |
| | 10 | 241 | 149 | 201 | 255 |
| | 11 | 242 | 166 | 218 | 255 |
| | 12 | 243 | 183 | 236 | 255 |

ALPHA BLENDING PALETTIZED IMAGE DATA

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to digital image processing, and, in particular, to alpha blending.

2. Description of the Related Art

Alpha blending is a standard technique of combining two or more input images together to generate a resulting blended image, where each pixel of the blended image is the result of taking the weighted average of the corresponding pixels of the input images. The weighted average is dictated by alpha-channel values, which may vary from pixel to pixel within an image, and from frame to frame, in the case of alpha blending of two or more video streams.

Alpha blending is typically applied to image data in a three-component color format, such as RGB24where each of the red (R), green (G), and blue (B) components is represented by an 8-bit value. The alpha channel may also be represented by 8-bit values. For example, when alpha blending two images together, each pixel of the blended image may be represented by three blended components ($R_b$,$G_b$, $B_b$) generated based on straightforward weighted averaging according to the following Equations (1)–(3):

$$R_b = \frac{R_1 * \alpha + R_2 * (256 - \alpha)}{256} \quad (1)$$

$$G_b = \frac{G_1 * \alpha + G_2 * (256 - \alpha)}{256} \quad (2)$$

$$B_b = \frac{B_1 * \alpha + B_2 * (256 - \alpha)}{256} \quad (3)$$

where $\alpha$ is the alpha-channel value for the blended pixel, and ($R_1$,$G_1$,$B_1$) and ($R_2$,$G_2$,$B_2$) are corresponding pixels of the two input images. The resulting blended image presents a visual effect based on contributions from both input images. Alpha blending is used, for example, to simulate fades between images or scenes, or certain transparency effects (e.g., a window where the viewer sees both the view through the window as well as a partial reflection off the surface of the window).

Another standard color format for image data is the color lookup table (CLUT) format. In CLUT format, each pixel is represented by a single (e.g., 8-bit) value that is used as an index to a color lookup table which maps the index to a specific three-component (e.g., RGB24) color. An 8-bit CLUT, for example, supports up to 256 different CLUT8 indices that can map to up to 256 different RGB24 colors. In general, each CLUT8 index can map to any of the possible RGB24 colors, with little or no correlation to other CLUT8 indices and other possible RGB24 colors.

It is desirable to provide the capability to perform alpha blending of image data in CLUT format (also known as palettized image data). Unfortunately, applying an equation based on the straightforward weighted averaging of Equations (1)–(3) will typically not provide the correct results, or even an acceptable result. For example, assume that a pixel from the first input image is represented by the CLUT8 index 6, defined by the CLUT to map to a particular shade of pink. Assume further that the corresponding pixel from the second input image is represented by the CLUT8 index 8, defined by the CLUT to map to a similar but different shade of pink. If the corresponding 8-bit alpha-channel value is 128, then applying straightforward weighted averaging would produce a CLUT8 index of 7 for the corresponding blended pixel. Unfortunately, because there need be little if any correlation between CLUT8 indices, the CLUT8 index 7 can map to any RGB24 color, for example, a shade of green. Clearly, alpha blending that mixes together two shades of pink to generate a shade of green will not be useful in conventional applications of alpha blending.

The present invention is directed to an efficient and accurate method of alpha blending two or more palettized images represented in a CLUT color format.

Further objects and advantages of this invention will become apparent from the detailed description of a preferred embodiment which follows.

SUMMARY OF THE INVENTION

The present invention is directed to alpha-blending palettized image data. According to a preferred embodiment, a first set of palettized image data and a second set of palettized image data are provided, wherein each pixel of the palettized image data is represented by an index of a color lookup table (CLUT), and each pixel of the first set corresponds to a pixel of the second set. A set of alpha-channel values is provided, wherein each alpha-channel value corresponds to a pixel of the first set. Each pixel of the first and second sets of palettized image data is mapped to an index space. A set of blended pixels is generated, wherein each blended pixel is generated from a pixel of the first set in the index space, a corresponding pixel of the second set in the index space, and a corresponding alpha-channel value. The blended pixels are mapped back to CLUT indices to generate palettized blended image data.

BRIEF DESCRIPTION OF THE DRAWINGS

Other objects, features, and advantages of the present invention will become more fully apparent from the following detailed description of the preferred embodiment, the appended claims, and the accompanying drawings in which:

FIGS. 1a–i show an 8-bit color lookup table, according to a preferred embodiment of the present invention;

DESCRIPTION OF THE PREFERRED EMBODIMENT(S)

Figure 2:
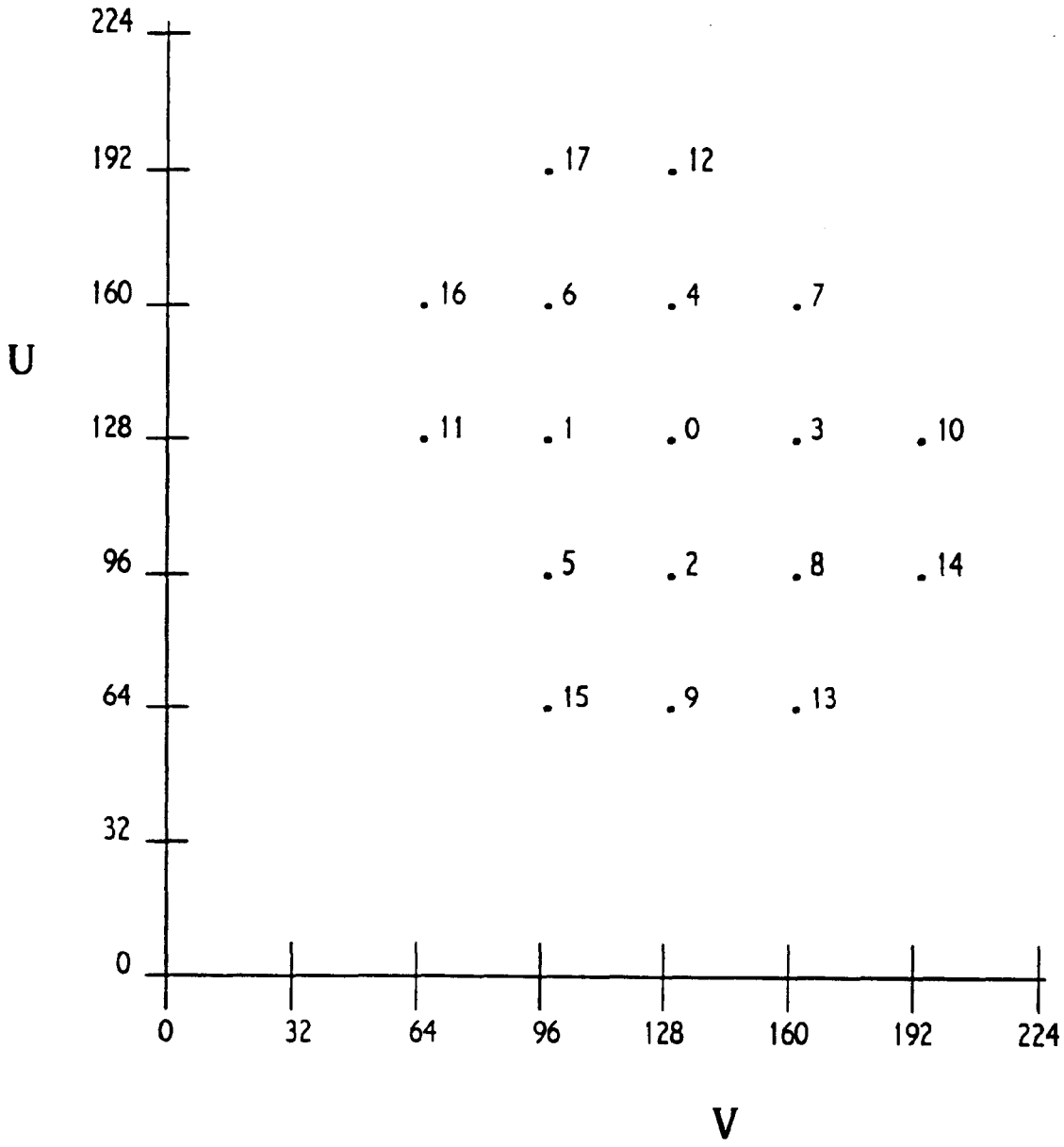
FIG. 2 is a graphical representation of the 18 different UV indices for the color lookup table of FIGS. 1a–i as plotted in the UV component plane.

The present invention is directed to a scheme for performing alpha blending on palettized image data. One way to apply alpha blending to palettized image data is to (a) map the input pixels to three-component RGB24 color format, (b) perform the alpha blending in RGB space using Equations (1)–(3), and then (c) map the resulting blended image data in RGB24 format back to CLUT8 format. The first two steps are relatively easy; the third step can be computationally expensive. Because so few of the $2^{24}$ different possible RGB24 colors are actually represented in an 8-bit CLUT (i.e., at most 256), in general, the pixels of the resulting blended image will not be represented exactly by CLUT indices.

When there is no straightforward mathematical equation for mapping from RGB24 space back to CLUT8 space, the blended image can be mapped back to CLUT8 space by an exhaustive search algorithm that compares each RGB24 pixel of the blended image with each RGB24 color represented in the lookup table to select the CLUT8 index corresponding to the closest color. The closest color may be defined, for example, as the color having the smallest geometric distance d.

The geometric distance $d_i$ between the current blended pixel $(R_b,G_b,B_b)$ and the $i^{th}$ CLUT color $(R_i,G_i,B_i)$ may be defined as the sum of the absolute differences as in the following Equation (4):

$$d_i=|R_b-R_i|+|G_b-G_i|+|B_b-B_i| \quad (4)$$

Alternatively, the geometric distance $d_i$ may be defined as the square root of the sum of the squares of the differences as in the following Equation (5):

$$d_i = \sqrt{(R_b - R_i)^2 + (G_b - G_i)^2 + (B_b - B_i)^2} \quad (5)$$

In either case, the computational load on a processor for such an approach can be great.

Pseudocode for an exhaustive search algorithm based on Equation (4) is as follows:

```
BestIndex = 0;
BestIndex Value = MAX_INT;
for (i=0; i<256; i++)
{
  value = abs(Rb − Ri) + abs(Gb − Gi) + abs(Bb − Bi);
  if (value < BestIndex Value)
  {
    BestIndex Value = value;
    BestIndex = i;
  }
}
CLUTb = BestIndex;
```

Such an exhaustive search algorithm will generate the correct blended CLUT indices ($CLUT_b$), but is computationally expensive.

Many color lookup tables are structured lookup tables in that they follow some recognizable pattern. The present invention takes into account the structure in such CLUTs to provide an efficient and accurate method for alpha blending of palettized image data. It does so by mapping the palettized image data to an index space different from the CLUT color space, performing the alpha blending using the index-space data, and then mapping the blended data back to the CLUT color space, where the mappings to the index color space and to the CLUT color space are based on a characterization of the structure of the CLUT.

Referring now to FIGS. 1a–i, there is shown an 8-bit color lookup table, according to a preferred embodiment of the present invention. The CLUT of FIGS. 1a–i maps 234 CLUT indices (from 10 to 243) to 234 RGB24 colors. The 8-bit R, G, and B values corresponding to the 234 different CLUT indices are tabulated in FIGS. 1a–i. The indices 0–9 and 244–255 are not part of the CLUT of FIGS. 1a–i. In a preferred embodiment, the colors for CLUT indices 0–9 and 246–255 are reserved and are defined by the particular operating system (i.e., a Microsoft Windows operating system). The colors for CLUT indices 10–243 are generated based on 18 different UV indices (from 0 to 17). For each UV index, there are 13 CLUT indices corresponding to a fixed (U,V) pair and 13 different Y component values ranging from 38 to 218 in increments of 15.

Referring now to FIG. 2, there is shown a graphical representation of the 18 different UV indices for the CLUT of FIGS. 1a–i as plotted in the UV component plane. The (U,V) component pairs for the 18 different UV indices are tabulated in Table I. As is evident from FIG. 2, besides being separated in increments of 32 and generally distributed around (128,128), there is little pattern to the location of the UV indices in the UV coordinate plane.

TABLE I

| UV INDEX | U COMPONENT | V COMPONENT |
|---|---|---|
| 0 | 128 | 128 |
| 1 | 128 | 96 |
| 2 | 96 | 128 |
| 3 | 128 | 160 |
| 4 | 160 | 128 |
| 5 | 96 | 96 |
| 6 | 160 | 96 |
| 7 | 160 | 160 |
| 8 | 96 | 160 |
| 9 | 64 | 128 |
| 10 | 128 | 192 |
| 11 | 128 | 64 |
| 12 | 192 | 128 |
| 13 | 64 | 160 |
| 14 | 96 | 192 |
| 15 | 64 | 96 |
| 16 | 160 | 64 |
| 17 | 192 | 96 |

Table II presents U and V coordinates corresponding to each UV index of Table I. Each pair of U and V coordinates represents the number of increments of 32 in the U and V components corresponding to a different UV index.

TABLE II

| UV INDEX | U INDEX | V INDEX |
|---|---|---|
| 0 | 4 | 4 |
| 1 | 4 | 3 |
| 2 | 3 | 4 |
| 3 | 4 | 5 |
| 4 | 5 | 4 |
| 5 | 3 | 3 |
| 6 | 5 | 3 |
| 7 | 5 | 5 |
| 8 | 3 | 5 |
| 9 | 2 | 4 |
| 10 | 4 | 6 |
| 11 | 4 | 2 |
| 12 | 6 | 4 |
| 13 | 2 | 5 |
| 14 | 3 | 6 |
| 15 | 2 | 3 |
| 16 | 5 | 2 |
| 17 | 6 | 3 |

Figure 3:
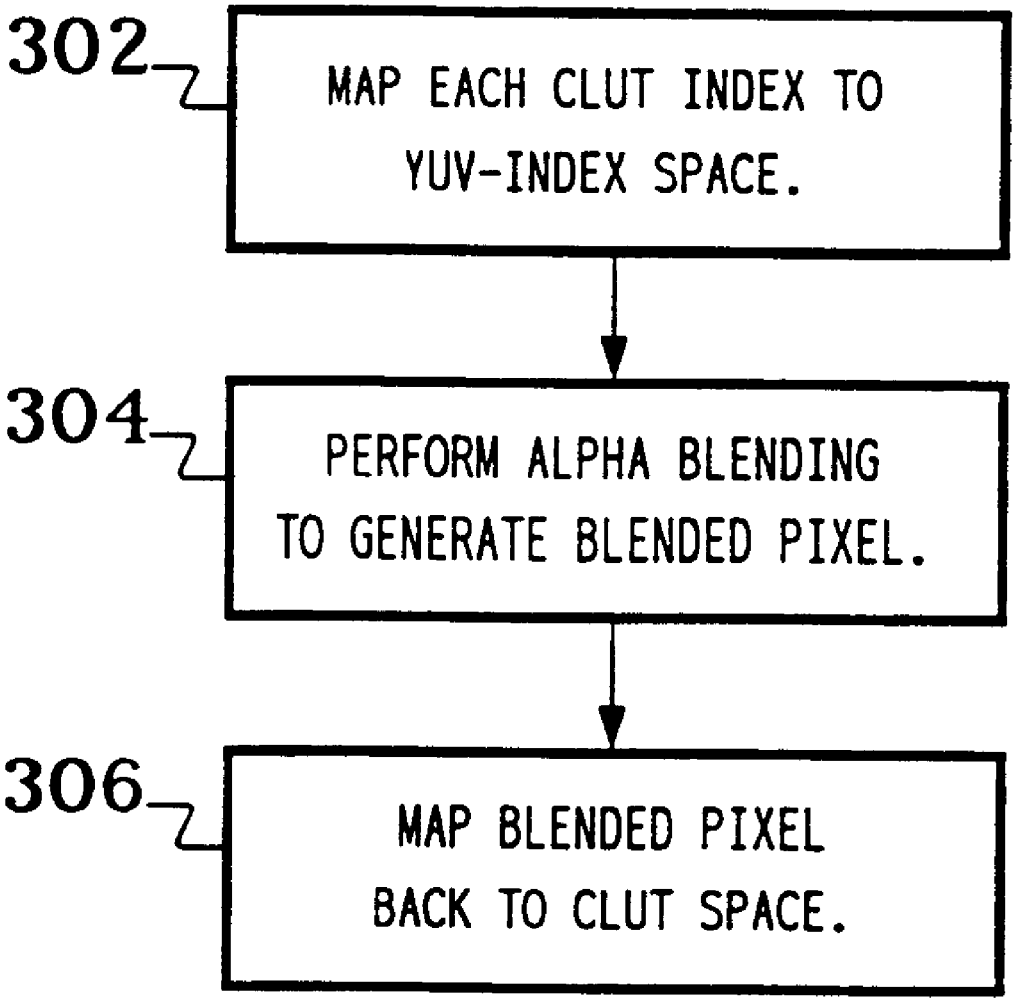
FIG. 3 is a flow diagram of alpha-blending processing for each pair of corresponding pixels of two palettized input images based on the CLUT of FIGS. 1a–i.

Referring now to FIG. 3, there is shown a flow diagram of alpha-blending processing for each pair of corresponding pixels of two palettized input images based on the CLUT of FIGS. 1a–i, according to a preferred embodiment of the present invention. According to this embodiment, corresponding pixels from the two palettized input images are mapped from the one-dimensional CLUT space to a YUV index space (step 302 of FIG. 3). Alpha blending is then performed to generate Y, U, and V coordinates of a blended pixel (step 304) and the resulting blended pixel is then mapped back to CLUT space (step 306).

The mapping of each palettized pixel from CLUT space to YUV index space (step 302) may be implemented according to the following Equations (6)–(7):

$$I_{UV}=(C-10)\ \text{DIV}\ 13 \tag{6}$$

$$I_Y=(C-10)\ \text{MOD}\ 13 \tag{7}$$

where:

C is the CLUT index, $I_{UV}$ is the UV index in YUV index space, $I_Y$ is the Y index in YUV index space, DIV is the integer division function, and MOD is the modulo function.

Those skilled in the art will understand that the mappings of Equations (6) and (7) may be implemented by evaluating the mathematical equations during real-time processing or using the CLUT index C as an index into lookup tables that return values pre-computed off line using Equations (6) and (7).

The blending of the two pixels in the YUV-index space (step 304 of FIG. 3) may be implemented according to Equations (8)–(10) as follows:

$$U_b=(\text{uLUT}[I_{UV1}]*\alpha+\text{uLUT}[I_{UV2}]*(256-\alpha)+128)\ \text{DIV}\ 256 \tag{8}$$

$$V_b=(\text{vLUT}[I_{UV1}]*\alpha+\text{vLUT}[I_{UV2}]*(256-\alpha)+128)\ \text{DIV}\ 256 \tag{9}$$

$$Y_b=(I_{Y1}*\alpha+I_{Y2}*(256-\alpha))\ \text{DIV}\ 256 \tag{10}$$

where:

$I_{UV1}$ and $I_{Y1}$ are the UV and Y indices in YUV index space for the pixel from the first input image, $I_{UV2}$ and $I_{Y2}$ are the UV and Y indices in YUV index space for the pixel from the second input image, uLUT and vLUT are lookup tables that map a UV index to U and V coordinates, respectively, as indicated in Table II, $\alpha$ is the 8-bit alpha-channel value for the pixels, DIV is the integer division function, and ($Y_b$, $U_b$, and $V_b$) are Y, U, and V coordinates for the blended pixel in a three-dimensional coordinate space.

The value 128 is added before each integer division operation in Equations (8)–(9) to ensure proper rounding to the closest integer. In an alternative embodiment, the value 128 may also be added before the integer division in Equation (10).

The mapping of the three-coordinate blended pixel back to CLUT space (step 306 of FIG. 3) may be implemented according to the following Equation (11):

$$C_b=Y_b+13*\text{uvLUT}[U_b][V_b]+10 \tag{11}$$

where:

$C_b$ is the CLUT index for the blended pixel in CLUT space, ($Y_b$, $U_b$, $V_b$) are Y, U, and V coordinates for the blended pixel from Equations (8)–(10), and uvLUT is a lookup table that maps the U and V coordinates back to the corresponding UV index.

The lookup table uvLUT is shown in Table III. Lookup table uvLUT is based on the locations of the UV indices as shown in FIG. 2. Because of the limited nature of the CLUT of FIGS. 1a–i, not all of the possible entries in uvLUT are needed.

TABLE III

| | 11/22 LOOKUP TABLE uvLUT V COORDINATE | | | | | | | |
|---|---|---|---|---|---|---|---|---|
| U COORD | 0 | 1 | 2 | 3 | 4 | 5 | 6 | 7 |
| 0 | | | | | | | | |
| 1 | | | | | | | | |
| 2 | | | 15 | 15 | 9 | 13 | 13 | |
| 3 | | | 5 | 5 | 2 | 8 | 14 | |
| 4 | | | 11 | 1 | 0 | 3 | 10 | |
| 5 | | | 16 | 6 | 4 | 7 | 7 | |
| 6 | | | 17 | 17 | 12 | 12 | 12 | |
| 7 | | | | | | | | |

Figure 4:
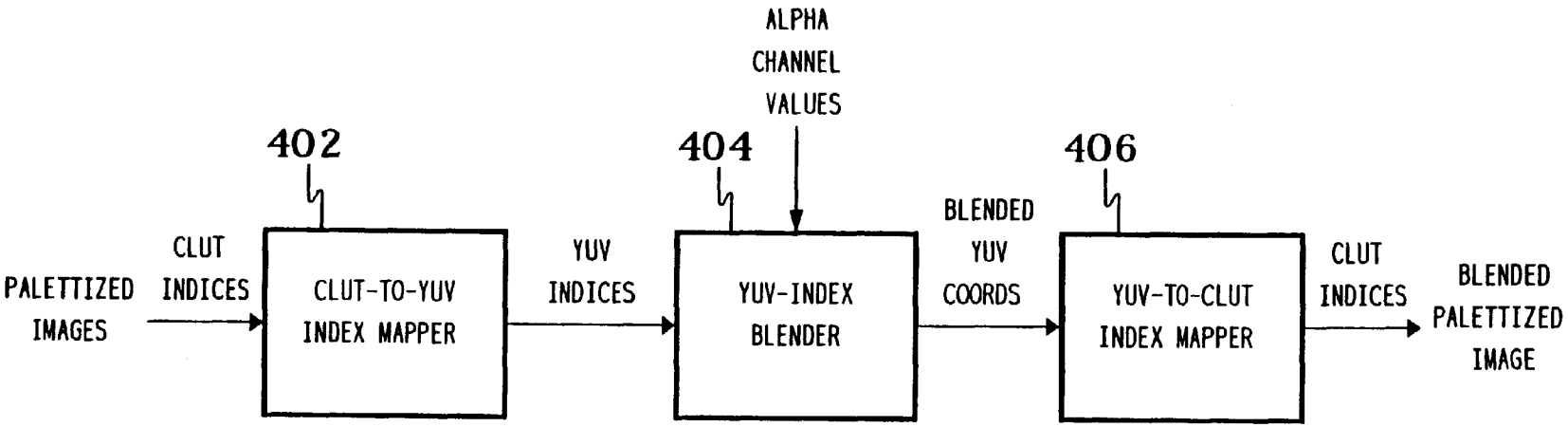
FIG. 4 is a block diagram of an apparatus for implementing the alpha-blending processing of FIG. 3.

Referring now to FIG. 4, there is shown a block diagram of an apparatus for implementing the alpha-blending processing of FIG. 3. CLUT-to-YUV index mapper 402 receives the CLUT indices for two palettized images and maps those CLUT indices to Y and UV indices. YUV-index blender 404 receives the Y and UV indices and the alpha channel values and generates blended pixels with Y, U, and V coordinates. YUV-to-CLUT index mapper 406 maps the blended pixels back to CLUT indices of the resulting blended palettized image. In a preferred embodiment, the alpha-blending processing of FIG. 3 is implemented in software executed on a general-purpose microprocessor, such as a Pentium® or Pentium® Pro processor manufactured by Intel Corporation.

Example of Alpha Blending

This section presents an example of the alpha-blending processing of FIG. 3 based on the CLUT of FIGS. 1a–i. In this example, the pixel from the first palettized image has a CLUT index value of 48, the corresponding pixel from the second palettized image has a CLUT index value of 120, and the alpha-channel value for blending these two pixels together is 64.

In order to demonstrate the embodiment of FIG. 3, the example is processed using Equations (1)–(3) and the exhaustive search algorithm described in conjunction with Equation (4). As shown in FIGS. 1b and 1e, the CLUT index 48 corresponds to the RGB24 color (235, 247, 170) and the CLUT index 120 corresponds to the RGB24 color (181, 116, 65). Applying Equations (1)–(3) yields the RGB24 color for the exact blended pixel ($R_b$, $G_b$, $B_b$) as follows:

$$R_b=\frac{R_1*\alpha+R_2*(256-\alpha)}{256}=\frac{235*64+181*(256-64)}{256}=194.50 \tag{13}$$

$$G_b=\frac{G_1*\alpha+G_2*(256-\alpha)}{256}=\frac{247*64+116*(256-64)}{256}=148.75 \tag{13}$$

$$B_b=\frac{B_1*\alpha+B_2*(256-\alpha)}{256}=\frac{170*64+65*(256-64)}{256}=91.25 \tag{14}$$

Implementing the pseudocode for the exhaustive search algorithm yields the RGB24 color (198, 134, 83) as the closest match in the CLUT of FIGS. 1a–i to the exact blended pixel. This RGB24 color is represented by CLUT index 121, which is therefore used to represent the blended pixel in the resulting palettized alpha-blended image.

The same example is now used in the alpha-blending processing of FIG. 3. Each pixel is mapped to YUV-index space (step 302 of FIG. 3) using Equations (6)–(7) as follows:

$$I_{UV1}=(C_1-10)\ \text{DIV}\ 13=(48-10)\ \text{DIV}\ 13=2 \quad (15)$$

$$I_{Y1}=(C_1-10)\ \text{MOD}\ 13=(48-10)\ \text{MOD}\ 13=12 \quad (16)$$

$$I_{UV2}=(C_2-10)\ \text{DIV}\ 13=(120-10)\ \text{DIV}\ 13=8 \quad (17)$$

$$I_{Y2}=(C_2-10)\ \text{MOD}\ 13=(120-10)\ \text{MOD}\ 13=6 \quad (18)$$

The pixels are then blended together to generate the blended pixel ($Y_b$, $U_b$, $Y_b$) (step 304 of FIG. 3) using Equations (8)–(10) as follows:

$$\begin{aligned} U_b &= (\text{uLUT}[2]*64+\text{uLUT}[8]*(256-64)+128)\text{DIV}\,256 \quad (19)\\ &= (3*64+3*192+128)\text{DIV}256\\ &= 3 \end{aligned}$$

$$\begin{aligned} V_b &= (\text{vLUT}[2]*64+\text{vLUT}[8]*(256-64)+128)\text{DIV}\,256 \quad (20)\\ &= (4*64+5*192+128)\text{DIV}256\\ &= 5 \end{aligned}$$

$$\begin{aligned} Y_b &= (I_{Y1}*\alpha+I_{Y2}*(256-\alpha))\text{DIV}\,256 \quad (21)\\ &= (12*64+6*192)\text{DIV}256\\ &= 7 \end{aligned}$$

The blended pixel ($Y_b$, $U_b$, $V_b$) is then mapped back to CLUT space (step 306 of FIG. 3) using Equation (11) as follows:

$$\begin{aligned} C_b &= Y_b+13*\text{uvLUT}[U_b][V_b]+10 \quad (22)\\ &= 7+13*\text{uvLUT}[3][5]+10\\ &= 7+13*8+10\\ &= 121 \end{aligned}$$

Thus, the alpha-blending of FIG. 3 yields the same result as the algorithm based on alpha-blending in RGB space followed by an exhaustive search to get back to CLUT space.

In the preferred embodiments described above, alpha blending is described in terms of palettized image data based on a CLUT that maps to RGB space, where the CLUT is generated based on structure in YUV space. Those skilled in the art will understand that the present invention also applies to palettized image data based on CLUTs that map to color spaces other than RGB (e.g., YUV, YIQ) and/or CLUTs that are generated based on structure in color spaces other than YUV (e.g., YIQ, RGB).

In the preferred embodiments described above, alpha blending was described in terms of combining two images together. Those skilled in the art will understand that the present invention also covers alpha blending of three or more images together where sufficient alpha-channel data is available to determine relative weighting between the input images. Moreover, the images may be frame of two or more video streams that are blended together.

The present invention can be embodied in the form of methods and apparatuses for practicing those methods. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for alpha-blending palettized image data, comprising the steps of:

(a) providing a first set of palettized image data and a second set of palettized image data, wherein:
each pixel of the palettized image data is represented by an index of a color lookup table (CLUT); and
each pixel of the first set corresponds to a pixel of the second set;

(b) providing a set of alpha-channel values, wherein each alpha-channel value corresponds to a pixel of the first set;

(c) mapping each pixel of the first and second sets of palettized image data to an index space;

(d) generating a set of blended pixels, wherein each blended pixel is generated from a pixel of the first set in the index space, a corresponding pixel of the second set in the index space, and a corresponding alpha-channel value; and (e) mapping the blended pixels back to CLUT indices to generate palettized blended image data.

2. The method of claim 1, wherein the mapping of pixels by step (c) to the index space and the mapping of the blended pixels by step (e) to the CLUT indices are based on a characterized structure of the CLUT.

3. The method of claim 1, wherein, for each pixel of the first set:

step (c) comprises the step of mapping the corresponding CLUT index for the pixel to two indices in the index space;

step (d) comprises the step of generating three coordinates of a blended pixel using the two indices in the index space as indices to one or more lookup tables; and step (e) comprises the step of using at least one of the coordinates of the blended pixel as an index to a lookup table to map the blended pixel to a CLUT index of the palettized blended image data.

4. The method of claim 1, wherein the palettized image data is represented by CLUT indices and for each pixel of the first set:

step (c) comprises the steps of:

(1) mapping the CLUT index for the pixel of the first set to a first UV index and a first Y index in the index space; and (2) mapping the CLUT index for the corresponding pixel of the second set to a second UV index and a second Y index in the index space;

step (d) comprises the steps of:

(1) generating a U coordinate of a blended pixel using the first UV index as an index to a U lookup table and the second UV index as an index to the U lookup table;

(2) generating a V coordinate of the blended pixel using the first UV index as an index to a V lookup table and the second UV index as an index to the V lookup table; and (3) generating a Y coordinate of the blended pixel using the first Y index and the second Y index; and step (e) comprises the step of using the U and V coordinates of the blended pixel as indices to a UV lookup table to map the blended pixel to a CLUT index of the palettized blended image data.

5. An apparatus for alpha-blending palettized image data, comprising:

(a) means for providing a first set of palettized image data and a second set of palettized image data, wherein:

each pixel of the palettized image data is represented by an index of a color lookup table (CLUT); and each pixel of the first set corresponds to a pixel of the second set;

(b) means for providing a set of alpha-channel values, wherein each alpha-channel value corresponds to a pixel of the first set;

(c) means for mapping each pixel of the first and second sets of palettized image data to an index space;

(d) means for generating a set of blended pixels, wherein each blended pixel is generated from a pixel of the first set in the index space, a corresponding pixel of the second set in the index space, and a corresponding alpha-channel value; and (e) means for mapping the blended pixels back to CLUT indices to generate palettized blended image data.

6. The apparatus of claim 5, wherein the mapping of pixels by means (c) to the index space and the mapping of the blended pixels by means (e) to the CLUT indices are based on a characterized structure of the CLUT.

7. The apparatus of claim 5, wherein, for each pixel of the first set:

means (c) maps the corresponding CLUT index for the pixel to two indices in the index space;

means (d) generates three coordinates of a blended pixel using the two indices in the index space as indices to one or more lookup tables; and means (e) uses at least one of the coordinates of the blended pixel as an index to a lookup table to map the blended pixel to a CLUT index of the palettized blended image data.

8. The apparatus of claim 5, wherein the palettized image data is represented by CLUT indices and for each pixel of the first set:

means (c):

(1) maps the CLUT index for the pixel of the first set to a first UV index and a first Y index in the index space; and (2) maps the CLUT index for the corresponding pixel of the second set to a second UV index and a second Y index in the index space;

means (d):

(1) generates a U coordinate of a blended pixel using the first UV index as an index to a U lookup table and the second UV index as an index to the U lookup table;

(2) generates a V coordinate of the blended pixel using the first UV index as an index to a V lookup table and the second UV index as an index to the V lookup table; and (3) generates a Y coordinate of the blended pixel using the first Y index and the second Y index; and means (e) uses the U and V coordinates of the blended pixel as indices to a UV lookup table to map the blended pixel to a CLUT index of the palettized blended image data.

9. A storage medium encoded with machine-readable computer program code for alpha-blending palettized image data, comprising:

(a) means for causing a computer to provide a first set of palettized image data and a second set of palettized image data, wherein:

each pixel of the palettized image data is represented by an index of a color lookup table (CLUT); and each pixel of the first set corresponds to a pixel of the second set;

(b) means for causing the computer to provide a set of alpha-channel values, wherein each alpha-channel value corresponds to a pixel of the first set;

(c) means for causing the computer to map each pixel of the first and second sets of palettized image data to an index space;

(d) means for causing the computer to generate a set of blended pixels, wherein each blended pixel is generated from a pixel of the first set in the index space, a corresponding pixel of the second set in the index space, and a corresponding alpha-channel value; and (e) means for causing the computer to map the blended pixels back to CLUT indices to generate palettized blended image data.

10. The storage medium of claim 9, wherein the mapping of pixels by means (c) to the index space and the mapping of the blended pixels by means (e) to the CLUT indices are based on a characterized structure of the CLUT.

11. The storage medium of claim 9, wherein, for each pixel of the first set:

means (c) causes the computer to map the corresponding CLUT index for the pixel to two indices in the index space;

means (d) causes the computer to generate three coordinates of a blended pixel using the two indices in the index space as indices to one or more lookup tables; and means (e) causes the computer to use at least one of the coordinates of the blended pixel as an index to a lookup table to map the blended pixel to a CLUT index of the palettized blended image data.

12. The storage medium of claim 9, wherein the palettized image data is represented by CLUT indices and for each pixel of the first set:

means (c) causes the computer to:

(1) map the CLUT index for the pixel of the first set to a first UV index and a first Y index in the index space; and (2) map the CLUT index for the corresponding pixel of the second set to a second UV index and a second Y index in the index space;

means (d) causes the computer to:

(1) generate a U coordinate of a blended pixel using the first UV index as an index to a U lookup table and the second UV index as an index to the U lookup table;

(2) generate a V coordinate of the blended pixel using the first UV index as an index to a V lookup table and the second UV index as an index to the V lookup table; and (3) generate a Y coordinate of the blended pixel using the first Y index and the second Y index; and means (e) causes the computer to use the U and V coordinates of the blended pixel as indices to a UV lookup table to map the blended pixel to a CLUT index of the palettized blended image data.

13. An apparatus for alpha-blending palettized image data, comprising:

a first mapper;

a blender; and a second mapper, wherein:

the first mapper receives a first set of palettized image data and a second set of palettized image data, wherein:

each pixel of the palettized image data is represented by an index of a color lookup table (CLUT); and each pixel of the first set corresponds to a pixel of the second set;

the first mapper maps each pixel of the first and second sets of palettized image data to an index space;

the blender receives a set of alpha-channel values, wherein each alpha-channel value corresponds to a pixel of the first set;

the blender generates a set of blended pixels, wherein each blended pixel is generated from a pixel of the first set in the index space, a corresponding pixel of the second set in the index space, and a corresponding alpha-channel value; and the second mapper maps the blended pixels back to CLUT indices to generate palettized blended image data.

14. The apparatus of claim 13, wherein the mapping of pixels by the first mapper to the index space and the mapping of the blended pixels by the second mapper to the CLUT indices are based on a characterized structure of the CLUT.

15. The apparatus of claim 13, wherein, for each pixel of the first set:

the first mapper maps the corresponding CLUT index for the pixel to two indices in the index space;

the blender generates three coordinates of a blended pixel using the two indices in the index space as indices to one or more lookup tables; and the second mapper uses at least one of the coordinates of the blended pixel as an index to a lookup table to map the blended pixel to a CLUT index of the palettized blended image data.

16. The apparatus of claim 13, wherein the palettized image data is represented by CLUT indices and for each pixel of the first set:

the first mapper:

(1) maps the CLUT index for the pixel of the first set to a first UV index and a first Y index in the index space; and (2) maps the CLUT index for the corresponding pixel of the second set to a second UV index and a second Y index in the index space;

the blender:

(1) generates a U coordinate of a blended pixel using the first UV index as an index to a U lookup table and the second UV index as an index to the U lookup table;

(2) generates a V coordinate of the blended pixel using the first UV index as an index to a V lookup table and the second UV index as an index to the V lookup table; and (3) generates a Y coordinate of the blended pixel using the first Y index and the second Y index; and the second mapper uses the U and V coordinates of the blended pixel as indices to a UV lookup table to map the blended pixel to a CLUT index of the palettized blended image data.

*17. A method for blending image data comprising:*

*mapping a first set and a second set of pelletized image data having corresponding pixels expressed in indices of a color lookup table (CLUT) to an index space;*

*generating blended pixels by blending said corresponding pixels of said first and second sets of pelletized image data in said index space, said blending being based, at least in part, on at least one alpha-channel value; and*

*mapping said blended pixels to said CLUT indices.*

*18. The method of claim 17, wherein mapping said sets to said index space is based, at least in part, on a characterized structure of said CLUT.*

*19. The method of claim 18, wherein mapping said blended pixels is based, at least in part, on said characterized structure.*

*20. The method of claim 17, wherein said index space comprises at least two indices.*

*21. The method of claim 20, wherein blending said corresponding pixels comprises:*

*generating at least three coordinates in said index space; and*

*using said at least two indices as indices to at least one lookup table; and*

*indexing a specific lookup table of said at least one lookup table using at least one of said at least three coordinates to map said blended pixels to said CLUT indices.*

*22. The method of claim 17, wherein said index space is a YUV index space.*

*23. The method of claim 22, wherein blending said corresponding pixels comprises:*

*generating Y, U and V coordinates of a blended pixel using said sets as indices to a respective at least one YUV lookup table.*

*24. The method of claim 23, wherein said U and V coordinates are indices to a UV lookup table to map said blended pixel to said CLUT indices.*

*25. An apparatus for blending image data comprising:*

*an image data source including a first and second set of palettized image data represented by indices of a color lookup table (CLUT), said sets having corresponding pixels;*

*at least one mapper capable of mapping said sets to an index space;*

*a blender capable of blending said corresponding pixels of said sets in said index space based, at least in part, on at least one alpha-channel value, said first set having pixels corresponding to a respective one of said at least one alpha-channel value to create blended pixels; and*

*said at least one mapper being further capable of mapping said blended pixels to said CLUT indices.*

*26. The apparatus of claim 25, wherein said CLUT comprises a characterized structure, and said mapping to said index space and said mapping to said CLUT indices is based, at least in part, on said characterized structure.*

*27. The apparatus of claim 25, wherein said index spaces comprises a YUV index space.*

*28. An article comprising: a storage medium;*

*said storage medium having stored thereon instructions to map to an index space a first set and second set of palletized image data having corresponding pixels expressed in indices of a color lookup table (CLUT);*

*blend said corresponding pixels of said first and second sets of palletized image data in said index space based, at least in part, on at least one alpha-channel value; and*

*map said blended pixels to indices of said CLUT.*

*29. The article of claim 28, wherein said CLUT comprises a characterized structure; and*

*said mapping to said index space and said mapping to said CLUT indices are based, at least in part, on said characterized structure.*

*30. The article of claim 29, wherein said index space comprises a YUV index space.*

* * * * *